United States Patent [19]

Ormerod

[11] 4,216,651
[45] Aug. 12, 1980

[54] SEALING ARRANGEMENT FOR USE IN A COMBUSTION ASSEMBLY

[75] Inventor: Alan Ormerod, Oswaldtwistle, England

[73] Assignee: Lucas Industries Limited, Birmingham, England

[21] Appl. No.: 904,288

[22] Filed: May 9, 1978

[30] Foreign Application Priority Data

May 11, 1977 [GB] United Kingdom ............... 19705/77

[51] Int. Cl.² ............................................. F02C 7/28
[52] U.S. Cl. ................... 60/740; 60/39.82 S; 431/264
[58] Field of Search ......... 60/39.74 R, 39.32, 39.82 S, 60/39.82 P; 431/264, 265

[56] References Cited

U.S. PATENT DOCUMENTS

| | | | |
|---|---|---|---|
| 3,200,875 | 8/1965 | Cramer | 431/264 |
| 3,264,825 | 8/1966 | Halls | 60/39.82 S |
| 3,990,834 | 11/1976 | DuBell | 60/39.82 S |

FOREIGN PATENT DOCUMENTS 1018963  2/1966  United Kingdom ............... 60/39.82 S

*Primary Examiner*—Douglas Hart
*Attorney, Agent, or Firm*—Holman & Stern

[57] ABSTRACT

A sealing arrangement designed to seal an opening in a flame tube wall into which an igniter and a fuel spray device mounted on a casing extend. The sealing arrangement comprises a first plate having a first aperture therein through which the fuel spray device extends with clearance and a grommet defining a second aperture through which the igniter extends to locate the first plate, and a second plate having a grommet defining a first aperture through which the fuel spray device extends to locate the second plate and a second aperture through which the igniter extends with clearance. The plates are relatively movable so as to permit relative axial and radial movement between the flame tube and the fuel spray device and the igniter caused by thermal expansion.

12 Claims, 5 Drawing Figures

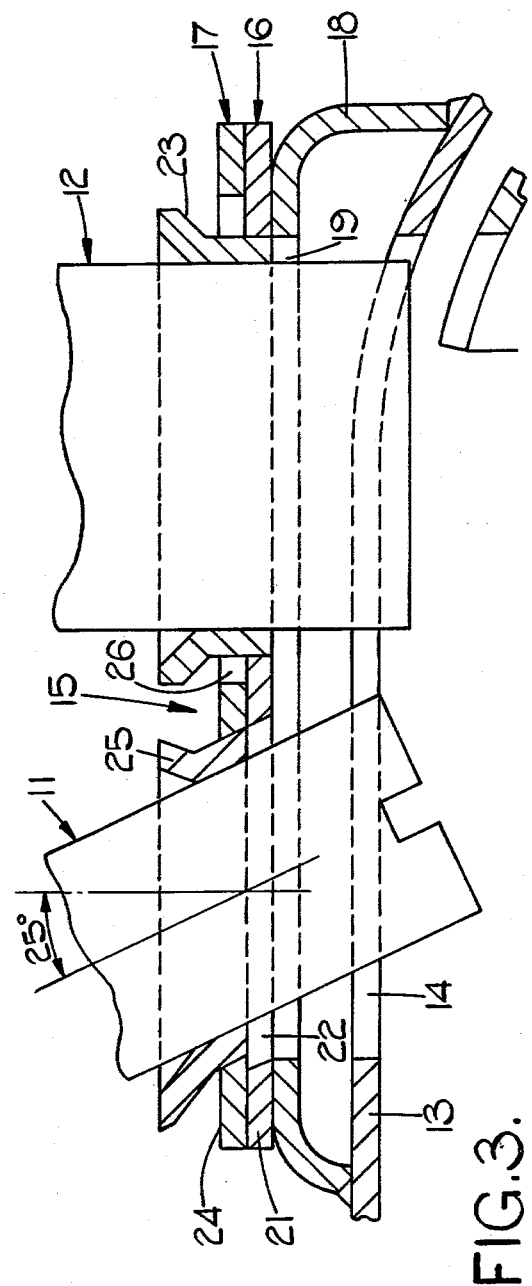

SEALING ARRANGEMENT FOR USE IN A COMBUSTION ASSEMBLY

BRIEF SUMMARY OF THE INVENTION

This invention relates to a sealing arrangement for use in a combustion assembly particularly, though not exclusively, in a gas turbine engine.

According to one aspect of the present invention, there is provided a sealing arrangement for use in a combustion assembly, comprising a first member having therein a first aperture which is arranged to accommodate a fuel spray device, with clearance and a second aperture which is arranged to accommodate an igniter such that the first member is located by said igniter in use, and a second member having therein a first aperture which is arranged to accommodate the fuel spray device such that the second member is located by said fuel spray device in use and a second aperture which is arranged to accommodate the igniter with clearance, the first and second members being relatively movable.

According to another aspect of the present invention, there is provided a combustion assembly comprising a casing, a flame tube disposed within the casing and having opening means therein, an igniter and a fuel spray device mounted on the casing and disposed in the opening means, and a sealing arrangement for sealing the igniter and fuel spray device in the opening means, the sealing arrangement including first and second members mounted on the flame tube so as to overlie the opening means, the first member having therein a first aperture through which the fuel spray device extends with clearance and a second aperture through which the igniter extends, the first member being located by the igniter, the second member having therein a first aperture through which the fuel spray device extends and a second aperture through which the igniter extends with clearance, the second member being located by the fuel spray device, the first and second members being relatively movable so as to permit relative axial and radial movement between the flame tube and the fuel spray device and igniter mounted on the casing caused in use by thermal expansion.

Preferably, the first and second members each include a respective plate, the plates being in mutual facial contact.

The second aperture in the first member can be defined by a grommet which is located by the igniter. Similarly, the first aperture in the second member also can be defined by a grommet which is located by the fuel spray device.

The axis of the grommet can be inclined to the perpendicular to the plate in the second member, where the fuel spray device is inclined relative to the igniter.

Advantageously, the members rest on a wall of the flame tube and are held in position by straps mounted on the flame tube wall. Most advantageously, the members rest on a platform which stands proud of the flame tube wall and which surrounds the opening means.

BRIEF DESCRIPTION OF THE DRAWINGS

An embodiment of the present invention will now be described, by way of example, with reference to the accompanying drawings, in which:

FIG. 3 is an enlarged view of the sealing arrangement of FIGS. 1 and 2; and

FIGS. 4 and 5 are plan views of respective parts of the sealing arrangement of FIGS. 1 to 3.

DETAILED DESCRIPTION

Figure 1:
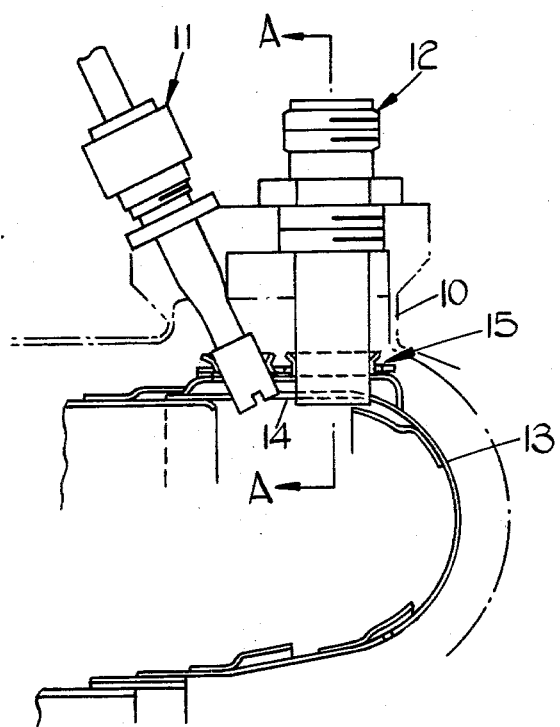
FIG. 1 is a schematic axial sectional view of part of an annular combustion assembly, which forms part of a gas turbine engine, including a sealing arrangement according to the present invention.
Figure 2:
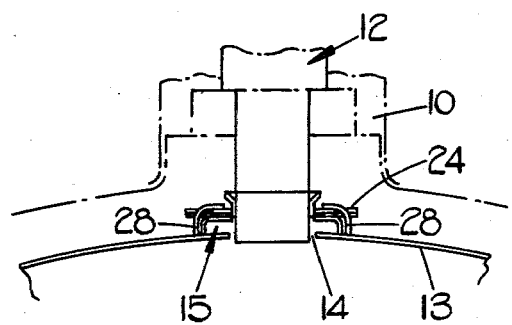
FIG. 2 is a section taken along the line A—A in FIG. 1.

Referring first to FIGS. 1 and 2, the combustion apparatus comprises an outer casing 10 on which are mounted an igniter 12 and a fuel spray device 11, the latter having its axis inclined relative to the former. Disposed within the casing 10 is a flame tube 13 which has an opening 14 in its outer wall, through which opening 14 the igniter 12 and fuel spray device 11 extend. A sealing arrangement 15 is provided for substantially sealing the igniter 12 and fuel spray device 11 in the opening 14, although in practice leakage of a small amount of air will occur through the sealing arrangement 15.

The sealing arrangement 15 is shown in detail in FIG. 3; and comprises generally a first seal member 16 and a second seal member 17. The members 16 and 17 rest on a platform 18 which stands proud of the outer wall of the flame tube 13 on the outside thereof and which surrounds the opening 14. An opening 19 is provided in the platform 18, and the members 16 and 17 overlie both the opening 19 and the opening 14 in the flame tube wall.

The seal member 16 (shown in detail in FIG. 4) rests directly on the platform 18, and includes a plate 21 having a first aperture 22 therein through which the fuel spray device 11 extends with clearance, and a grommet 23 mounted on the plate 21. The grommet 23 defines a second aperture in the member 16 through which the igniter 12 extends, the grommet 23 being located by the latter.

The seal member 17 (shown in detail in FIG. 5) rests on top of the seal member 16 and includes a plate 24, which is in facial contact with the plate 21, and a grommet 25 mounted on the plate 24. The grommet 25 defines a first aperture in the member 17 through which the fuel spray device 11 extends, the grommet 25 being located by the latter. A second aperture 26 is provided in the plate 24, and the igniter 12 together with grommet 23 extends through the aperture 26 with clearance.

Because of the inclination of the fuel spray device 11 relative to the igniter 12, the aperture 22 in the member 16 and the grommet 25 of the member 17 have their axes inclined to the perpendicular to the plates 21 and 24.

As can be seen in FIG. 2, the seal members 16 and 17 are held in position on the platform 18 by means of straps 28 which are mounted on the outer wall of the flame tube 13 and which engage the upper surface of the plate 24. The straps 28 serve to urge the plates 21 and 24 into facial engagement, whilst permitting the members 16 and 17 to slide relative to one another in the longitudinal direction of the combustion assembly. The straps 28 also retain the members 16 and 17 in position in a manner which enables the fuel spray device 11 and igniter 12 to be easily re-engaged with the members 16 and 17 after they have been removed therefrom for inspection or servicing. The members 16 and 17 are slidable relative to one another so as to permit relative axial and radial movement between the flame tube 13 and the fuel spray device 11 and igniter 12 mounted on the outer casing 10, caused in use by thermal expansion.

As indicated above, the sealing arrangement 15 does not produce a perfect seal, but reduces air leakage therethrough to a minimum.

I claim:

1. A sealing arrangement for use in a combustion assembly, comprising a first member having therein a first aperture which is arranged to accommodate a fuel spray device with clearance and a second aperture which is arranged to accommodate an igniter such that said first member is located by the igniter in use, and a second member having therein a first aperture which is arranged to accommodate the fuel spray device such that said second member is located by the fuel spray device in use and a second aperture which is arranged to accommodate the igniter with clearance, said first and second members being relatively movable.

2. The sealing arrangement according to claim 1, wherein each of said first and second members each include a respective plate, said plates being in mutual facial contact.

3. The sealing arrangement according to claim 1, wherein the second aperture in said first member is defined by a grommet which is arranged to be located by the igniter in use.

4. The sealing arrangement according to claim 1, wherein the first aperture in said second member is defined by a grommet which is arranged to be located by the fuel spray device in use.

5. The sealing arrangement according to claim 4, wherein said second member includes a plate, and the axis of said grommet is inclined to the perpendicular to said plate so that the fuel spray device is inclined relative to the igniter in use.

6. A combustion assembly comprising a casing, a flame tube disposed within said casing and having opening means therein, an igniter and a fuel spray device mounted on said casing and disposed in the opening means, and a sealing arrangement for sealing said igniter and fuel spray device in the opening means, said sealing arrangement including first and second members mounted on said flame tube so as to overlie the opening means, said first member having therein a first aperture through which said fuel spray device extends with clearance and a second aperture through which said igniter extends, said first member being located by said igniter, said second member having therein a first aperture through which said fuel spray device extends and a second aperture through which said igniter extends with clearance, said second member being located by said fuel spray device, said first and second members being relatively movable so as to permit relative axial and radial movement between said flame tube and said fuel spray device and igniter mounted on said casing caused in use by thermal expansion.

7. The combustion assembly according to claim 6, wherein said first and second members each include a respective plate, said plates being in mutual facial contact.

8. The combustion assembly according to claim 6, wherein the second aperture in said first member is defined by a grommet which is located by said igniter.

9. The combustion assembly according to claim 6, wherein the first aperture in said second member is defined by a grommet which is located by said fuel spray device.

10. The combustion assembly according to claim 9, wherein said fuel spray device is inclined relative to said igniter, said second member includes a plate, and the axis of said grommet is inclined to the perpendicular to said plate.

11. The combustion assembly according to claim 6, wherein said first and second members rest on a wall of said flame tube and are held in position by straps mounted on said wall.

12. The combustion assembly according to claim 11, wherein said first and second members rest on a platform which stands out from said wall of said flame tube and which surrounds the opening means.

* * * * *